United States Patent [19]
Westwood

[11] 3,789,873
[45] Feb. 5, 1974

[54] PNEUMATIC PRESSURE TRANSMITTING DEVICE

[75] Inventor: Herbert Wilfred Westwood, Orpington, England

[73] Assignee: Darenth Weighing Equipment Limited, Kent, England

[22] Filed: Oct. 8, 1971

[21] Appl. No.: 187,693

[30] Foreign Application Priority Data
Oct. 15, 1970 Great Britain.................. 49,093/70

[52] U.S. Cl............. 137/514.3, 137/82, 137/514.5, 177/208
[51] Int. Cl............................................. G01g 5/00
[58] Field of Search ........73/141 A; 137/514, 514.3, 137/514.5, 514.7; 177/208, 209; 251/53

[56] References Cited
UNITED STATES PATENTS

| | | | |
|---|---|---|---|
| 3,130,746 | 4/1964 | Vener.............................. | 137/529 X |
| 3,108,649 | 10/1963 | Hamilton............................ | 177/208 |
| 1,294,002 | 2/1919 | Weatherhead.................. | 137/514 X |
| 1,503,357 | 7/1924 | Ensign.............................. | 137/514.7 |
| 957,311 | 5/1910 | Davis et al. .................. | 137/514.3 X |
| 2,917,076 | 12/1959 | Ramo............................... | 137/514.3 |
| 3,086,550 | 4/1963 | Cummings......................... | 137/514 |
| 3,180,453 | 4/1965 | Murata ........................... | 137/514 X |
| 3,621,713 | 11/1971 | Wirth et al...................... | 73/141 A |

FOREIGN PATENTS OR APPLICATIONS

| | | | |
|---|---|---|---|
| 411,366 | 4/1910 | France................................ | 137/514 |

*Primary Examiner*—Robert G. Nilson
*Assistant Examiner*—Edward Look
*Attorney, Agent, or Firm*—Brisebois & Kruger

[57] ABSTRACT

A pneumatic pressure transmitting device for transmitting a pneumatic pressure which is in linear relation to a variable applied force, of the kind comprising a pneumatic pressure chamber having an inlet duct with throttling means for admitting air under a pressure greater than that to be transmitted, and an outlet duct in communication with the inlet duct downstream of the throttling means, and a pneumatic pressure relief opening which is closed by a loose cover which engages a seating surrounding the opening, the cover being acted upon by a damper which damps its movement off and on to the seating to prevent it from vibrating and also acted upon by a member by which the variable force is applied to it as a thrust along a line of action in alignment with the resultant of the pneumatic pressure in the chamber acting on the cover, so that when a force is applied to the member and air is supplied under pressure through the inlet duct, the pressure in the chamber increases until the cover is moved off its seating against the applied force to allow air to escape from the opening to such an extent that equilibrium is established between the oppositely acting pressure and force on the cover, the equilibrium pressure which is in linear relation to the force being transmitted through the outlet duct, the device being provided outside of the pneumatic pressure chamber with a receptacle for receiving oil or other damping liquid, and the damper including a plate which is supported near the bottom of the receptacle where, in use, it is submerged in the damping liquid, one part, that is either the receptacle or the plate being rigid with the cover and the other part, that is the plate or the receptacle respectively, being rigid with the body containing the pneumatic pressure chamber.

5 Claims, 2 Drawing Figures

PNEUMATIC PRESSURE TRANSMITTING DEVICE

This invention relates to pneumatic pressure transmitting devices for transmitting a pneumatic pressure which is in linear relation to a variable applied force.

One form of device for this purpose, an example of which is described in the specification of U.S. Pat. No. 3,108,649 comprises a pneumatic pressure chamber having an inlet duct with throttling means for admitting air under a pressure greater than that to be transmitted, an outlet duct in communication with the inlet duct downstream of the throttling means and a pneumatic pressure relief opening which is closed by a loose cover which engages a seating surrounding the opening. The cover is acted upon by a damper which damps its movement off and on to the seating to prevent it from vibrating and it is also acted upon by a member by which the variable force is applied to it as a thrust along a line of action in alignment with the resultant of the pneumatic pressure in the chamber acting on the cover. Thus, when a force is applied to the member and air is supplied under pressure through the inlet duct, the pressure in the chamber increases until the cover is moved off its seating against the applied force to allow air to escape from the opening to such an extent that equilibrium is established between the oppositely acting pressure and force on the cover, the equilibrium pressure which is in linear relation to the force being transmitted through the outlet duct.

In the example of this form of device particularly described in U.S. Pat. No. 3,108,649 the damper comprises a disc which is fixed to the cover and is located near the bottom of the chamber so that it is submerged in oil or other damping liquid contained in the chamber, and on movement of the cover, the disc is moved in the liquid in a direction normal to its surface and thus produces a damping action.

This form of damper has been found to operate quite satisfactorily over comparatively short periods of time, but as the damping liquid is contained in the pneumatic chamber, it is directly exposed to the flow of air through the chamber from the inlet duct through the opening when, in use, the cover is moved by the air pressure off its seating. In general the air supplied to the chamber is not absolutely clean and consequently over a long period of operation, the oil or other damping liquid in the pneumatic chamber becomes contaminated to such an extent that the operation of the device is impaired.

The aim of the present invention is to avoid this difficulty and construct the device in such a way that its period of operation before servicing of the damper becomes necessary is considerably increased.

According to this invention, in a pneumatic pressure transmitting device of the form described, an open-topped receptacle for receiving oil or other damping liquid is provided outside the pneumatic pressure chamber and the damper comprises a plate which is supported near the bottom of the receptacle where, in use, it is submerged in the liquid, one part, that is either the receptacle or the plate, being rigid with the cover and the other part, that is the plate or the receptacle respectively, being rigid with the body containing the pneumatic pressure chamber.

The receptacle may be an annular trough fixed around the outside of the chamber body, and in this case the damping plate is also annular and is rigidly connected to the cover by individual legs or a perforated skirt extending from the periphery of the cover. However, in this case the cover necessarily has a part projecting radially outwards beyond the seating surrounding the pressure relief opening and air escaping through this opening from the chamber acts on this projecting part before being exhausted between the legs or through the perforated skirt and may slightly upset the relationship between the pressure in the chamber and the force applied to the cover.

Preferably therefore, the receptacle, preferably in the form of a cup, is provided on the face of the cover remote from the seating, and the plate is rigidly connected to the body containing the pneumatic pressure chamber. In this case also, the plate is preferably annular, and the member by which the variable force is applied to the cover extends through the central opening of the annular plate into engagement with the cover.

Preferably the damping plate is rigidly connected to the body by means of a cap comprising a peripheral skirt which is connected to the outside wall of the body, preferably by being screwed onto a cylindrical portion of the wall, a top which extends inwards from the skirt over the rim of the receptacle and which has a central hole through which the member for applying the variable force extends, and a part which depends from the underside of the top and carries the plate, the skirt having a series of perforations or other openings around it through which, in use, air escaping from the chamber through the pressure relief opening is exhausted.

With the arrangement in accordance with the invention, the flow of air escaping through the pressure relief opening, that is between the seating and the underside of the cover, is kept substantially clear of the surface of the oil or other damping liquid within the receptacle. With the preferred arrangement in which the receptacle is provided on the face of the cover remote from the seating, the oil or other damping liquid is separated from the escaping stream of air by the wall of the receptacle. Thus, in this case the oil or other damping liquid is not contaminated by any foreign matter in the air stream and a single filling of liquid in the receptacle can be used for a very long period compared with a single filling in the device particularly described in U.S. Pat. No. 3,108,649.

Furthermore, with the present arrangement the air inlet to the pneumatic pressure chamber extends through the wall of the chamber, and a drain opening may also be provided in the chamber wall, the drain opening being closed by a removable plug. After a period of use, the plug may be removed so that any liquid or other contaminant which has collected in the pneumatic chamber is blown out through the drain opening.

Two examples of the device in accordance with the present invention will now be described with reference to the accompanying drawings, in which.

Figure 1:
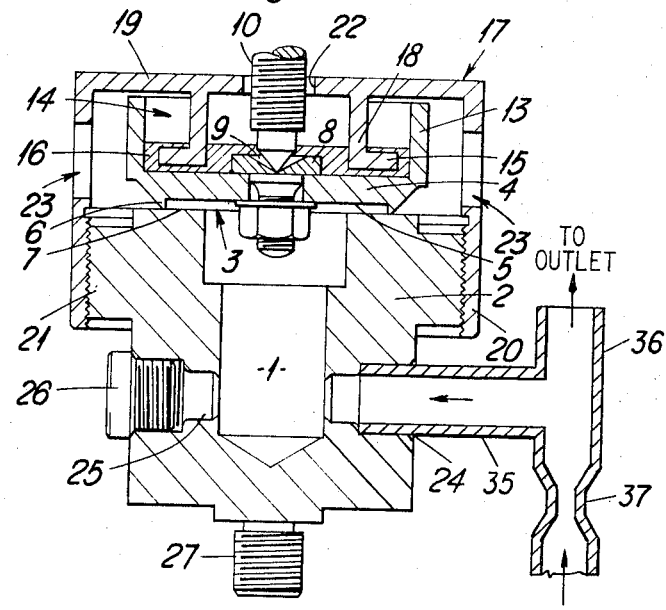
FIG. 1 is a longitudinal section through one example, omitting the inlet duct and throttling means, the outlet duct.

The device shown in FIG. 1 comprises a pneumatic pressure chamber 1 contained in a rigid cylindrical body 2. The chamber 1 is closed at its lower end but has an open top 3 which forms a pressure relief opening and this opening is normally closed by a loose circular cover 4. The cover 4 has a recess 5 in its under surface bounded by a circular ridge 6 terminating in a sharp edge which forms a seal on a flat seating surface 7 at the top end of the body 2. Fixed at the centre of the upper surface of the cover 4 is a bearing plate 8 containing a conical recess 9 for receiving the tip of a thrust member 10 for applying a force to the cover 4, the member 10 being shown only partially.

The cover 4 is formed integrally with a cylindrical wall 13 projecting upwards from its periphery to form a cup 14 on the upper face of the cover 4, i.e. on the face remote from the seating 7. An annular damping plate 15 is submerged in oil 16 contained at the bottom of the cup 14. The plate 15 is located co-axially with the cover 4 and the thrust member 10, and is held rigidly in position by means of a cap 17 which is rigidly connected to the outer wall of the pressure chamber body 2. The plate 15 is in fact formed as a radially outwardly projecting flange at the lower end of a cylindrical wall 18 which depends from the under surface of the top 19 of the cap 17. The top 19 extends over the rim of the cup 14 and at its periphery there is a downwardly extending cylindrical skirt 20 which is screwed at its lower end onto a wider diameter portion 21 near the upper end of the body 2. The top 19 of the cap 17 has a central hole 22 through which extends the thrust member 10. The upper region of the skirt 20, that is above the internally threaded lower region, contains a circumferentially extending series of perforations 23.

Opening into the side wall of the pressure chamber 1 through the body 2 is an air inlet port 24 for the connection of the air inlet duct 35 leading to the main duct 36 containing the thottle 37. The body 2 also contains a drain opening 25 which opens into the chamber 1 diametrically opposite the air inlet port 24. The drain opening 25 is normally closed by a removable plug 26. A screw threaded boss 27 projects from the lower end of the body 2 for mounting the device on a rigid support.

In use, air is supplied to the pressure chamber 1 through the inlet port 24, and when the pressure in the chamber 1 reaches a value such that the force created by the pressure acting on the under surface of the cover balances the force applied to the upper surface by the thrust member 10, the cover 4 lifts and air escapes from the chamber 1 through the pressure relief opening 3. This air is then exhausted through the perforations 23 in the skirt 20, the damping oil 16 being protected from the exhaust air flow by the wall 13.

Figure 2:
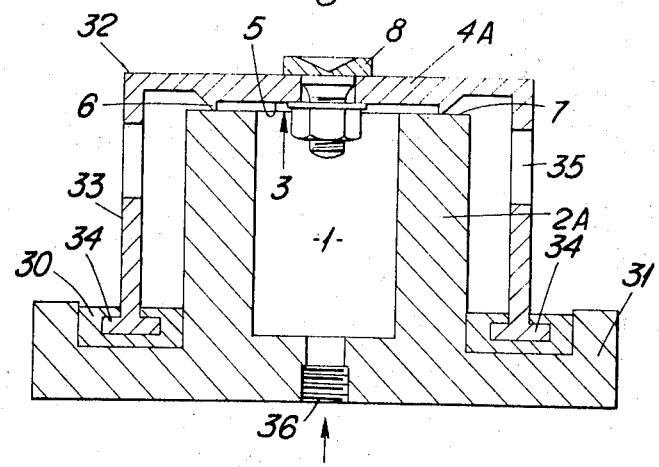
FIG. 2 is a diagrammatic longitudinal section through the second example, omitting the inlet duct and throttling means, the outlet duct, and the member for applying the variable force to the cover.

In the example shown in FIG. 2, there is a cylindrical body 2A containing a pneumatic pressure chamber 1 having at its top end a pressure relief opening 3 which is normally closed by a loose circular cover 4A. As in the example shown in FIG. 1, the cover 4 has a concentric ridge 6 on its under surface bounding a recess 5 and terminating in a sharp edge which seals with a flat seating surface 7 at the top end of the body 2A. The cover 4 also has a bearing plate 8 fixed at the centre of its upper surface for engagement by a thrust member (not shown) for applying a force to the cover 4A.

However, instead of having damping oil contained in a cup formed on the upper surface of the cover 4A, in the present example oil 30 is contained in an annular trough 31 which is formed integrally with the cylindrical body 2A and which extends around the bottom end of the outer wall of the body 2A. The cover 4A extends radially beyond the ridge 6 so that its periphery 32 is radially outwards of the outer wall of the body 2A. A cylindrical skirt 33 projects downwards from the periphery 32 of the cover 4A and carries at its lower end an annular damping plate 34 which is submerged in the oil 30 in the trough 31. In this way, the damping plate 34 is rigidly connected to the cover 4A. The upper region of the skirt 33 contains a series of perforations 35 extending around the skirt.

These perforations 35 allow air which escapes from the chamber 1 through the pressure relief opening 3 when the cover lifts from the seating 7 to be exhausted without the air stream coming into substantial contact with the oil 30, and in this way the oil remains clean for considerably longer than if it were contained inside the chamber 1. Air is supplied to the chamber 1 through an air inlet port 36 through the body 2 at the base of the chamber.

We claim:

1. In a pneumatic pressure transmitting device for transmitting a pneumatic pressure which is in linear relation to a variable applied force, said device comprising a body containing a pneumatic pressure chamber, inlet duct means leading to said chamber for admitting air under a pressure greater than that to be transmitted, throttling means in said inlet duct means, outlet duct means in communication with said inlet duct means downstream of said throttling means, means defining a pneumatic pressure relief opening from said chamber, a surface defining a seating surrounding said opening, a loose cover engaging said seating to close said opening, said cover being mounted for to and fro movement toward and away from said seating and being free also for lateral rocking movement relative to said seating, and a damper for damping both said to and fro and said lateral rocking movements of said cover to prevent said cover from vibrating, whereby when air is supplied under pressure through said inlet duct means to said pneumatic pressure chamber and a variable force is applied to said cover as a thrust in a direction in alignment with the resultant of the pneumatic pressure in said chamber acting on said cover, said pressure in said chamber increases until said cover is moved off said seating against said applied force to allow air to escape from said opening to such an extent that equilibrium is established between the pressure in said chamber and the variable force on said cover, said equilibrium pressure, which is in linear relation to said variable force, being transmitted through said outlet duct means, the improvement according to which said damper comprises an open-topped receptacle for receiving a damping liquid positioned outside said pneumatic pressure chamber on a face of said cover remote from said seating, a plate and means rigidly connecting said plate to said body containing said pneumatic pressure chamber and locating said plate in said receptacle so closely adjacent the bottom thereof that when said plate is submerged in said damping liquid movement of said plate away from said bottom produces a reduction in the liquid pressure on the underside of said plate which substantially inhibits said lateral rocking movement of said cover.

2. A device as claimed in claim 1, wherein said receptacle is in the form of a cup.

3. A device as claimed in claim 1 wherein said plate is annular and includes a center opening, and further comprises a member extending through said center opening into engagement with said cover for applying said variable force to said cover.

4. A device as claimed in claim 3, wherein said means mounting said plate comprises a cap consisting of a peripheral skirt, means connecting said skirt to the outside wall of said body, a top which extends inwards from said skirt over the rim of said receptacle, means on said top defining a central hole through which said member for applying said variable force extends, and a part depending from the underside of said top and carrying said plate, said skirt including means defining a series of openings around it through which in operation air escaping from said chamber through said pressure relief opening is exhausted.

5. A device as claimed in claim 4, wherein said means connecting said skirt to said outside wall of said body comprises cooperating screw threads on said skirt and said wall.

* * * * *